United States Patent
Bruenjes et al.

(10) Patent No.: US 9,971,142 B2
(45) Date of Patent: May 15, 2018

(54) OPTICAL LENS ASSEMBLY ADAPTED FOR A SOLAR TELESCOPE AND ASSOCIATED METHOD OF MANUFACTURING

(71) Applicant: DayStar Instruments, L.L.C., Warrensburg, MO (US)

(72) Inventors: Manfred Peter Bruenjes, Warrensburg, MO (US); Jennifer Dudley Winter, Warrensburg, MO (US)

(73) Assignee: DAYSTAR INSTRUMENTS, L.L.C., Warrensburg, MO (US)

( * ) Notice: Subject to any disclaimer, the term of this patent is extended or adjusted under 35 U.S.C. 154(b) by 149 days.

(21) Appl. No.: 15/084,040

(22) Filed: Mar. 29, 2016

(65) Prior Publication Data

US 2016/0291311 A1    Oct. 6, 2016

Related U.S. Application Data

(60) Provisional application No. 62/140,859, filed on Mar. 31, 2015.

(51) Int. Cl.
| | |
|---|---|
| *G02B 23/00* | (2006.01) |
| *G02B 23/16* | (2006.01) |
| *G02B 5/28* | (2006.01) |
| *G02B 13/22* | (2006.01) |

(52) U.S. Cl.
CPC ............ *G02B 23/16* (2013.01); *G02B 23/00* (2013.01); *G02B 5/284* (2013.01); *G02B 13/22* (2013.01)

(58) Field of Classification Search
CPC ........ G02B 23/00; G02B 23/12; G02B 23/14; G02B 23/45; G02B 23/16
USPC ....... 359/362, 363, 399, 400, 401, 423, 425, 359/426, 429, 432, 434
See application file for complete search history.

(56) References Cited

U.S. PATENT DOCUMENTS

| | | | |
|---|---|---|---|
| 3,278,752 A | 10/1966 | Brixner | |
| 3,864,037 A * | 2/1975 | Johnson | G01J 3/02 250/214 VT |
| 4,106,855 A | 8/1978 | Coon | |
| 4,184,749 A | 1/1980 | Grossman | |
| 5,243,614 A * | 9/1993 | Wakata | G01J 3/02 372/28 |
| 6,134,054 A * | 10/2000 | Abe | G02B 9/14 359/722 |
| 6,433,937 B1 * | 8/2002 | Konno | G02B 23/2484 359/682 |
| 6,509,970 B1 * | 1/2003 | Seki | G01J 9/0246 356/454 |
| 7,397,604 B2 | 7/2008 | Hruska | |
| 8,717,488 B2 | 5/2014 | Shpunt et al. | |
| 2007/0253063 A1 | 11/2007 | Hruska | |

FOREIGN PATENT DOCUMENTS

WO    2007082202 A2    7/2007

* cited by examiner

*Primary Examiner* — Arnel C Lavarias
(74) *Attorney, Agent, or Firm* — Thompson Coburn LLP

(57) ABSTRACT

An optical lens assembly adapted for a solar telescope including a diverging lens, a converging lens, an etalon filter, and a housing. The diverging lens, the converging lens, and the etalon filter being positioned within the housing. The diverging lens being located between the first opening and the converging lens, and the etalon filter being located between the converging lens and the second opening. The housing including at least one baffle located between the diverging lens and the converging lens.

52 Claims, 8 Drawing Sheets

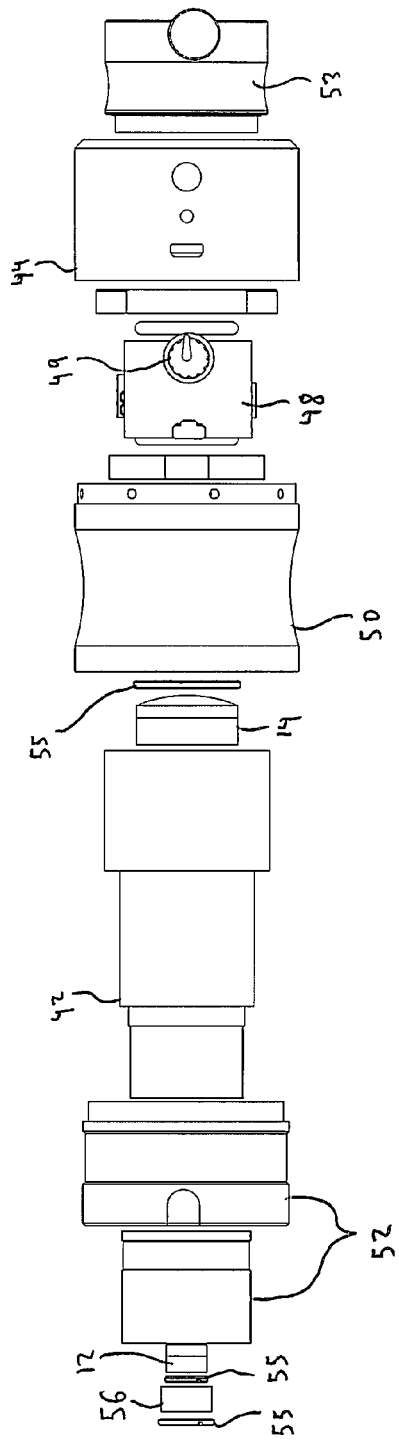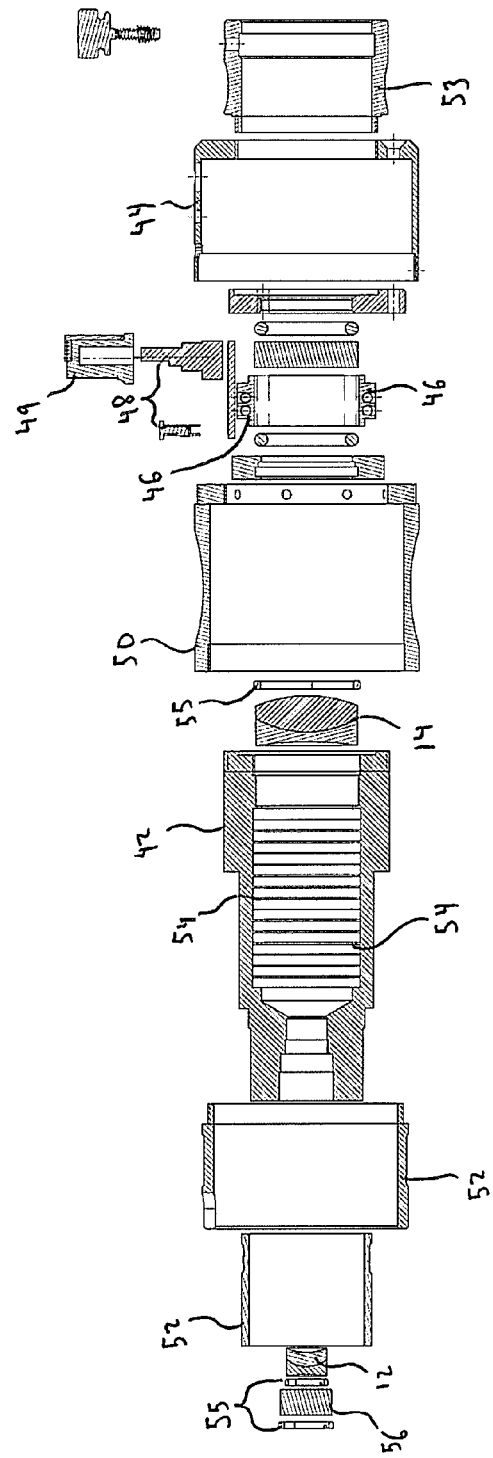

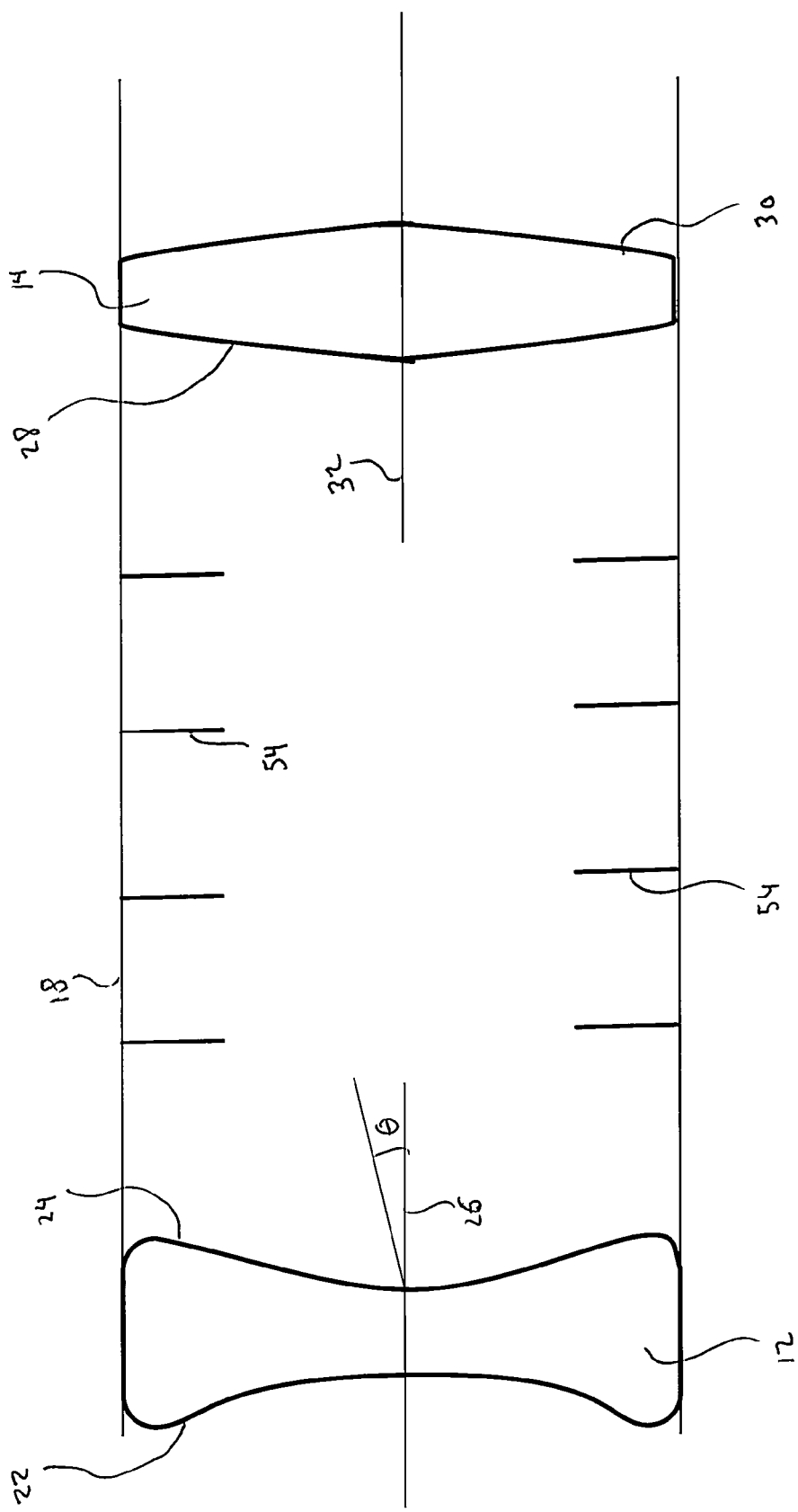

OPTICAL LENS ASSEMBLY ADAPTED FOR A SOLAR TELESCOPE AND ASSOCIATED METHOD OF MANUFACTURING

RELATED APPLICATION DATA

This application claims the benefit of provisional application Ser. No. 62/140,859, filed on Mar. 31, 2015, the disclosure of which is incorporated by reference herein in its entirety.

FIELD OF THE INVENTION

This invention pertains to an optical lens assembly. More specifically, this invention pertains to an optical lens assembly adapted for a solar telescope.

SUMMARY OF THE INVENTION

In one aspect of the invention, an optical lens assembly adapted for a solar telescope comprises a diverging lens, a converging lens, an etalon filter, and a housing. The diverging lens comprises a first surface and a first optical axis. The diverging lens is adapted to diverge a majority of light rays incident on the first surface away from the first optical axis. The converging lens comprises a second surface and a second optical axis. The converging lens is spaced from the diverging lens. The converging lens is adapted to converge a majority of light rays incident on the second surface toward the second optical axis. The etalon filter is adapted to transmit light rays having a wavelength within a desired wavelength range. The housing extends generally along a longitudinal axis. The housing defines first and second openings at opposite first and second ends of the housing. The first opening is adapted to permit light rays to enter the housing. The diverging lens, the converging lens, and the etalon filter are positioned within the housing. The diverging lens is located between the first opening and the converging lens. The etalon filter is located between the converging lens and the second opening. The housing comprises at least one baffle located between the diverging lens and the converging lens.

In another aspect of the invention, an optical lens assembly adapted for a solar telescope comprises a Barlow lens, an etalon filter, and a housing. The Barlow lens comprises a diverging lens, a converging lens, and an optical axis. The diverging lens is spaced from the converging lens. The diverging lens is adapted to diverge a majority of light rays incident on said diverging lens away from the optical axis. The converging lens is adapted to converge a majority of light rays incident on said converging lens toward the optical axis. The etalon filter is adapted to transmit light rays having a wavelength within a desired wavelength range. The housing extends generally along a longitudinal axis. The housing defines first and second openings at opposite first and second ends of the housing. The first opening is adapted to permit light rays to enter the housing. The diverging lens, the converging lens, and the etalon filter are positioned within the housing. The diverging lens is located between the first opening and the converging lens. The etalon filter is located between the converging lens and the second opening. The housing comprises at least one baffle located between the diverging lens and the converging lens. The at least one baffle is adapted to obstruct some of the light rays diverging away from the optical axis.

In another aspect of the invention, a method of assembling an optical lens assembly adapted for a solar telescope comprising positioning a diverging lens, a converging lens, and an etalon filter within a housing extending generally along a longitudinal axis with first and second openings at opposite first and second ends of the housing with the first opening being adapted to permit light rays to enter the housing. The diverging lens comprises a first surface and a first optical axis. The diverging lens is adapted to diverge a majority of light rays incident on the first surface away from the first optical axis. The converging lens comprises a second surface and a second optical axis with the converging lens being spaced from the diverging lens. The converging lens is adapted to converge a majority of light rays incident on the second surface toward the second optical axis. The etalon filter is adapted to transmit light rays having a wavelength within a desired wavelength range. The diverging lens is located between the first opening and the converging lens. The etalon filter is located between the converging lens and the second opening. The housing comprises at least one baffle located between the diverging lens and the converging lens.

In another aspect of the invention, an optical lens assembly adapted for a solar telescope comprises a diverging lens, a converging lens, an etalon filter, and a housing. The diverging lens comprises a first surface and a first optical axis. The diverging lens is adapted to diverge a light ray that is incident on the first surface and spaced from the first optical axis away from said first optical axis. The converging lens comprises a second surface and a second optical axis. The converging lens is spaced from the diverging lens. The converging lens is adapted to converge a light ray that is incident on the second surface and spaced from the second optical axis toward said second optical axis. The etalon filter is adapted to transmit light rays having a wavelength within a desired wavelength range. The housing extends generally along a longitudinal axis. The housing defines first and second openings at opposite first and second ends of the housing. The first opening is adapted to permit light rays to enter the housing. The diverging lens, the converging lens, and the etalon filter are positioned within the housing. The diverging lens is located between the first opening and the converging lens. The etalon filter is located between the converging lens and the second opening. The housing comprises at least one baffle located between the diverging lens and the converging lens.

Further features and advantages of the present invention, as well as the operation of the invention, are described in detail below with reference to the accompanying drawings.

BRIEF DESCRIPTION OF THE DRAWINGS

A perspective view of an embodiment of an optical lens assembly is shown in FIG. 1.

FIG. 6 shows an exploded view of FIG. 1.

FIG. 7 shows an exploded view of FIG. 5.

FIG. 9 shows a schematic representation of an embodiment of an optical lens assembly.

Figure 1:
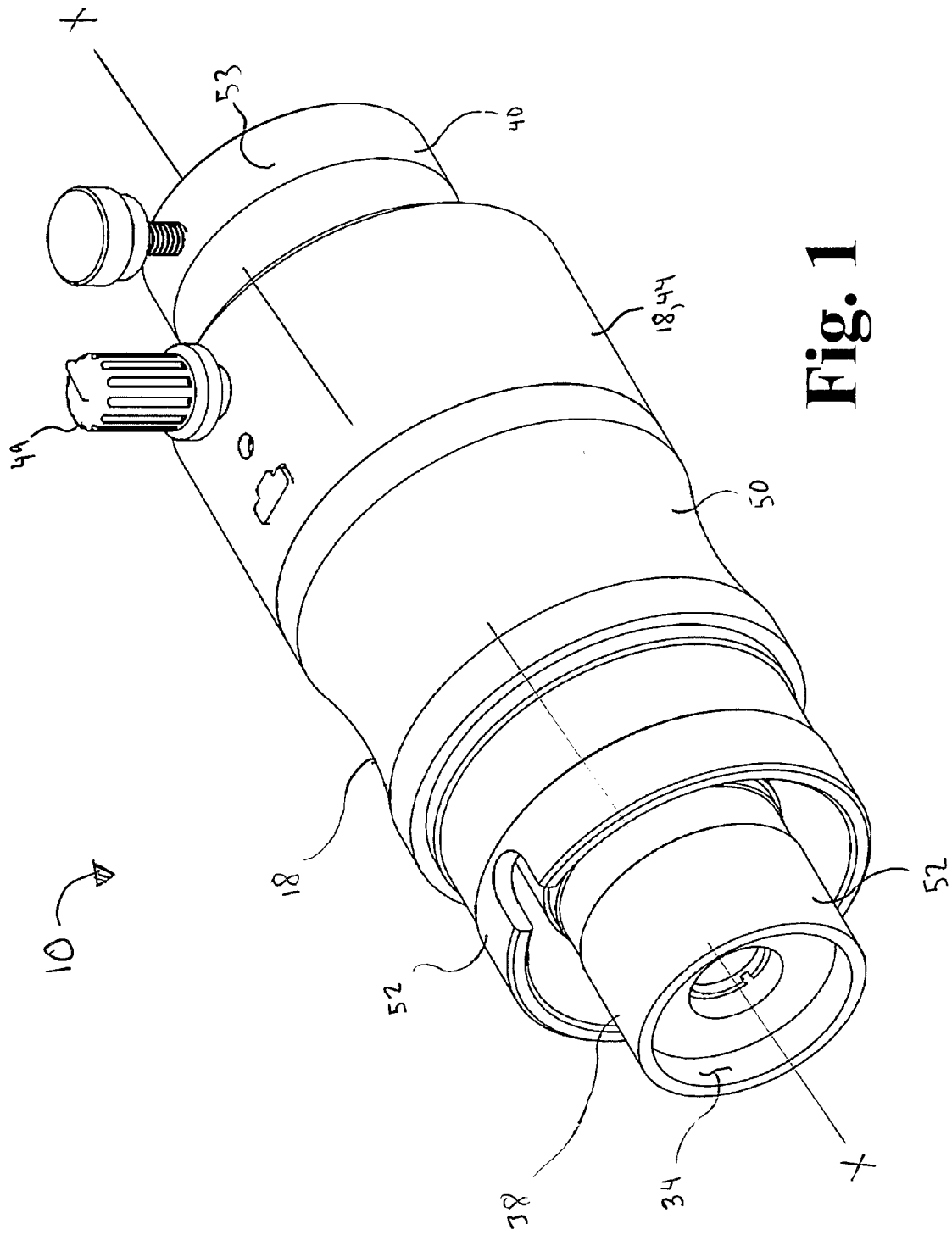

Reference numerals in the written specification and in the drawing figures indicate corresponding items.

DETAILED DESCRIPTION

Figure 5:
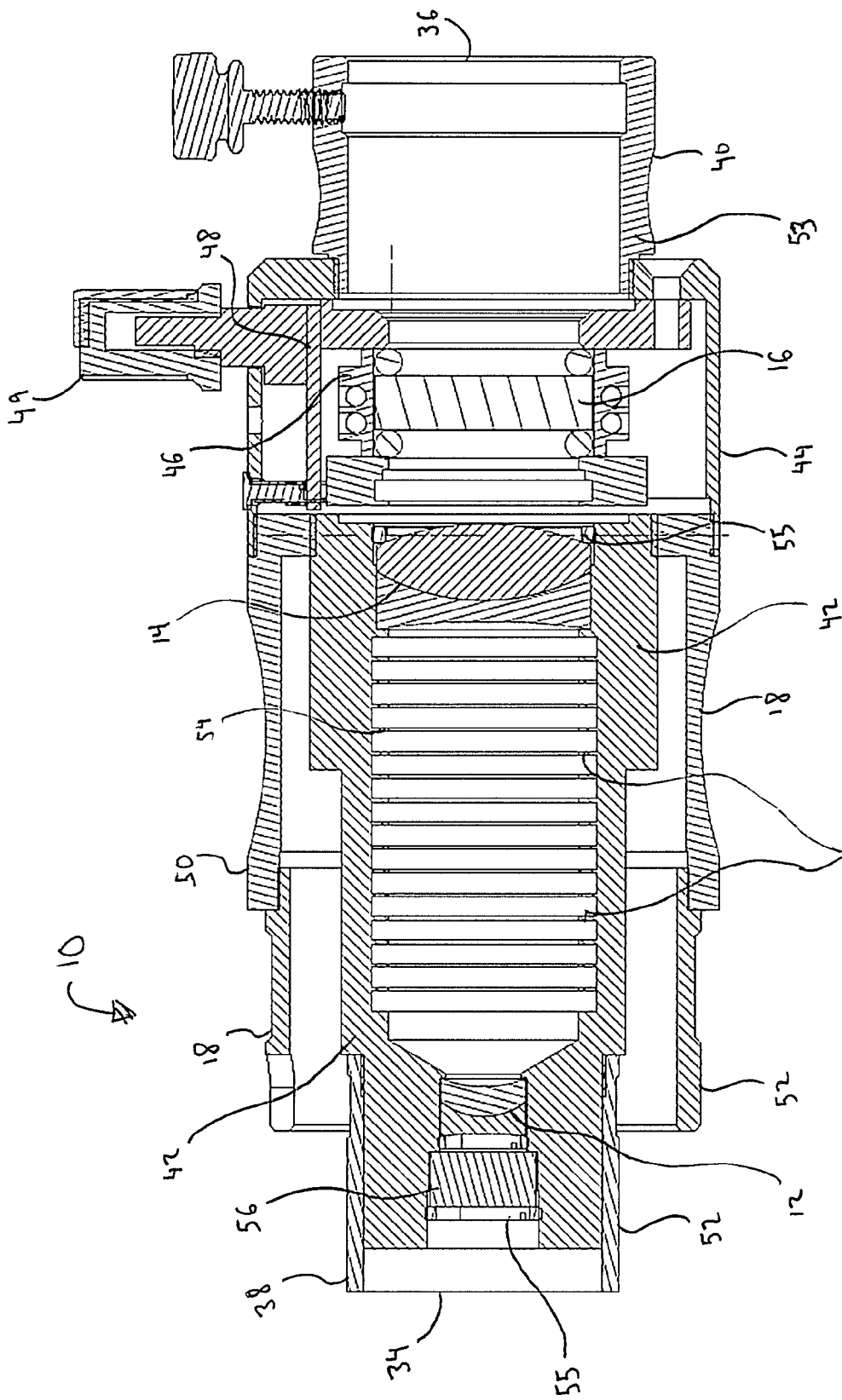
FIG. 5 shows a cross-sectional view of the optical lens assembly shown in FIGS. 1-4 taken along line A-A of FIG. 4.

An embodiment of the present invention, shown in FIGS. 1-7, is indicated generally by reference numeral 10. The optical lens assembly 10 is adapted for a solar telescope. The optical lens assembly 10 comprises a diverging lens 12, a converging lens 14, an etalon filter 16, and a housing 18, as shown in FIG. 5.

Figure 8:
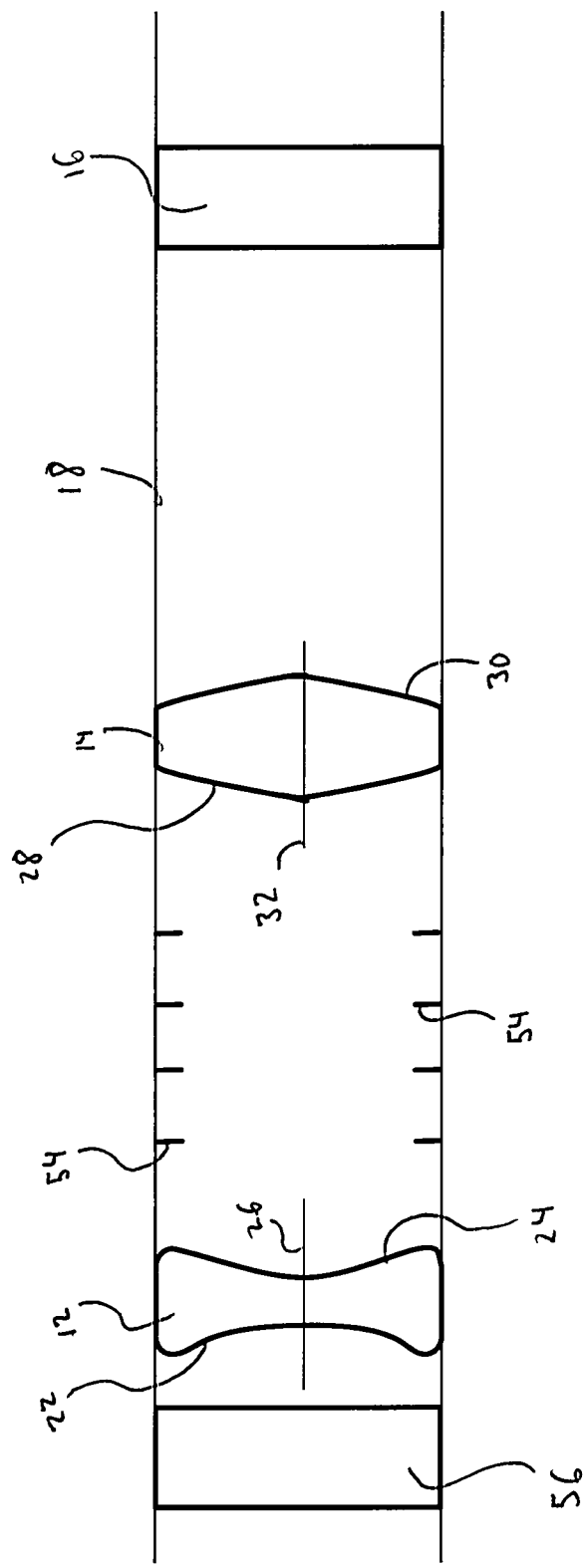
FIG. 8 shows a schematic representation of an embodiment of an optical lens assembly.

The diverging lens 12 comprises a first surface 22, a second surface 24, and an optical axis 26. The optical axis 26 passes through the first and second surfaces 22, 24 as shown in FIGS. 8 and 9. Preferably, the optical axis 26 coincides with an axis of rotational symmetry for the diverging lens. More preferably, the optical axis 26 passes through a center of curvature of both the first and second surfaces 22, 24. In one embodiment of the present invention, the diverging lens 12 is adapted such that a majority of light rays incident on the first surface 22 of the diverging lens diverge away from the optical axis 26. In another embodiment of the present invention, the diverging lens 12 is adapted such that a light ray incident on the first surface 22 and spaced from the optical axis 26 diverges away from the optical axis 26 as the light ray extends from the second surface 22.

The converging lens 14 comprises a first surface 28, a second surface 30, and an optical axis 32. The optical axis 32 passes through the first and second surfaces 28, 30. Preferably, the optical axis 32 coincides with an axis of rotational symmetry for the converging lens. More preferably, the optical axis 32 passes through a center of curvature of both the first and second surfaces 28, 30. In one embodiment of the present invention, the converging lens 14 is adapted such that a majority of light rays incident on the first surface 28 of the converging lens converge toward from the optical axis 32. In another embodiment of the present invention, the converging lens 14 is adapted such that a light ray incident on the first surface 28 and spaced from the optical axis 32 will converge toward the optical axis 32 as the light ray extends from the second surface 30.

The etalon filter 16 is a standard optical interferometer in which a ray of light undergoes multiple reflections between two reflecting surfaces as shown in FIGS. 7 and 8. The etalon filter 16 is adapted to transmit light rays having a wavelength within a desired wavelength range. Preferably, the desired wavelength range is between 200 nanometers and 1100 nanometers. In one embodiment, the desired wavelength range is between 656.1 nanometers to 656.5 nanometers such that the desired wavelength range includes the Hydrogen Alpha line. In another embodiment, the desired wavelength range is between 396.3 nanometers to 397.4 nanometers such that it includes the Calcium H line. In another embodiment, the desired wavelength range is between 392.8 nanometers to 393.9 nanometers such that it includes the Calcium K line. In another embodiment, the desired wavelength range is between 485.6 nanometers to 486.7 nanometers such that it includes the Hydrogen Beta line. In another embodiment, the desired wavelength range is between 587.0 nanometers to 588.1 nanometers such that it includes the Helium D3 line. In another embodiment, the desired wavelength range is between 588.5 nanometers to 590.1 nanometers such that it includes the Sodium D line. In another embodiment, the desired wavelength range is between 529.2 nanometers to 531.3 nanometers such that it includes the Iron XIV line. In another embodiment, the desired wavelength range is between 759.3 nanometers to 777.7 such that it includes the Oxygen line. Preferably, the etalon filter 16 is a Fabry-Perot interferometer. One of ordinary skill in the art will understand that the etalon filter 16 can be an air-spaced etalon filter, an oil spaced etalon filter, or a solid etalon filter.

Figure 2:
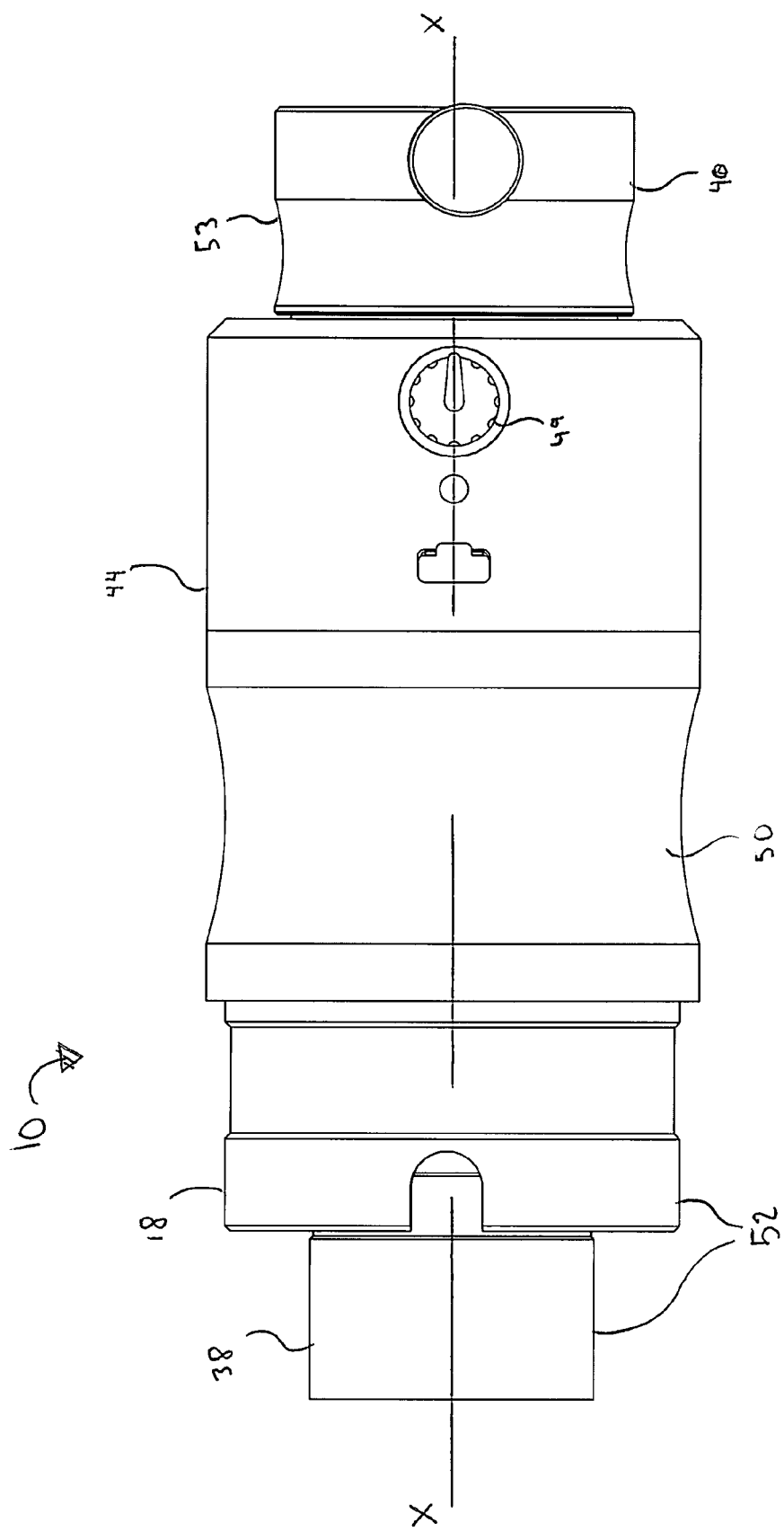
FIG. 2 shows a top plan view of the optical lens assembly shown in FIG. 1.
Figure 3:
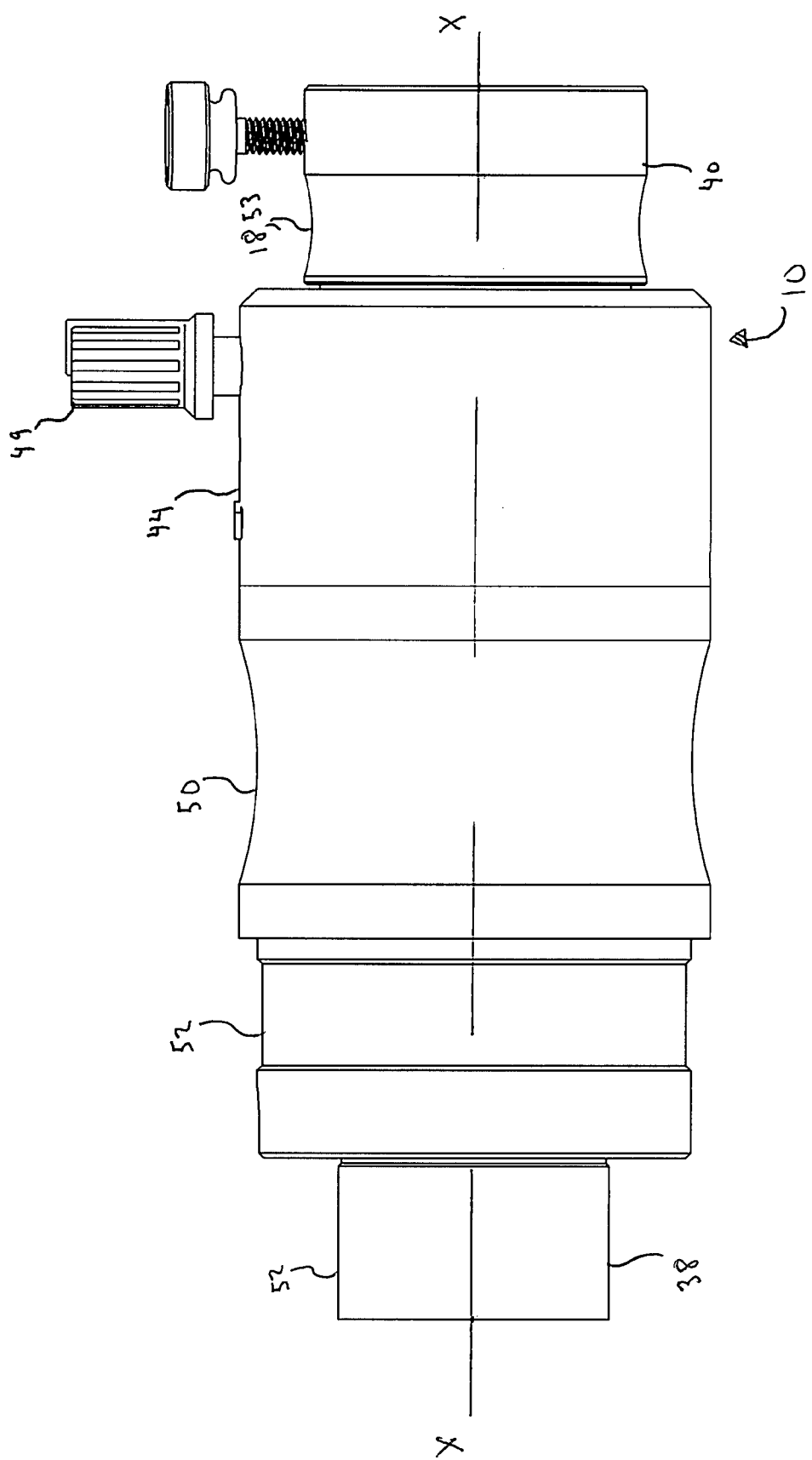
FIG. 3 shows a side elevational view of the optical lens assembly shown in FIGS. 1 and 2.
Figure 4:
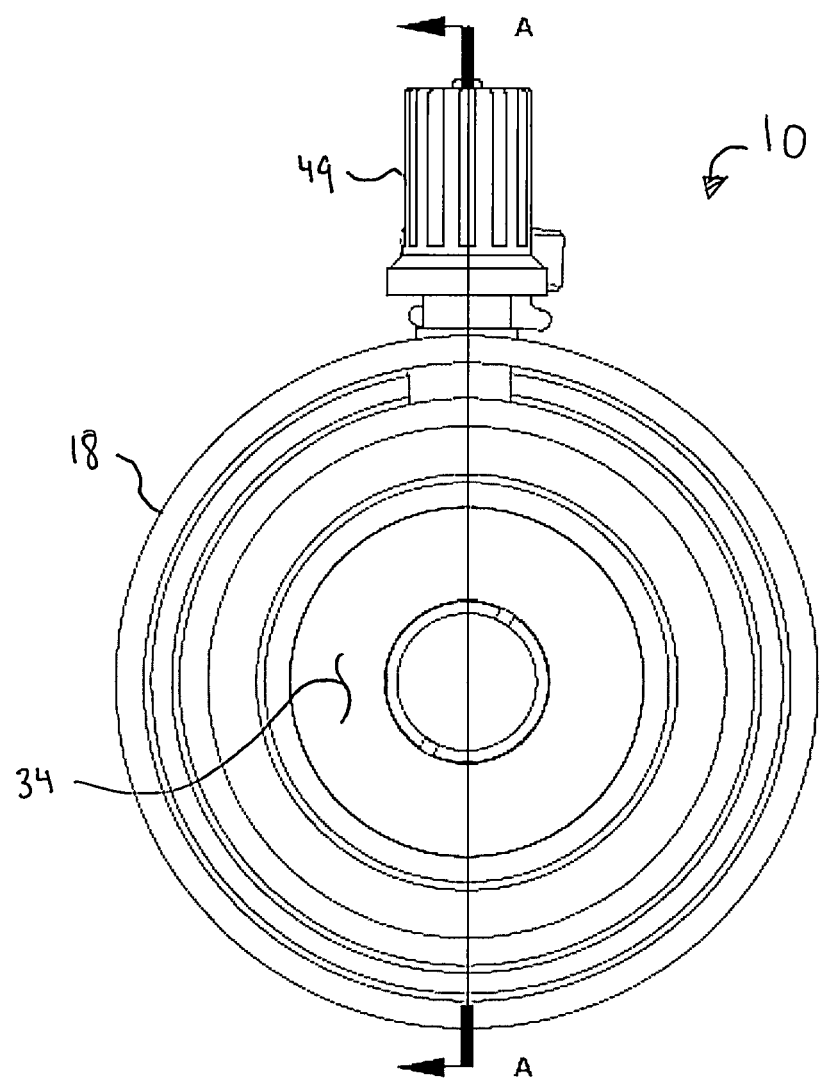
FIG. 4 shows a front elevational view of the optical lens assembly shown in FIGS. 1-3.

The housing 18 extends generally along a longitudinal axis X, as shown in FIGS. 1, 2 and 3. The housing 18 defines a first opening 34 in FIG. 4 and a second opening 36 in FIGS. 4 and 5. The first opening 34 is located at a first end 38 of the housing 18 shown in FIG. 1 and the second opening 36 is located at an opposite second end 40 of the housing. The first opening 34 is adapted to permit light rays to enter the housing 18 and the second opening 36 is adapted to permit light rays to exit the housing 18, shown in FIG. 5. Preferably, the housing 18 comprises a telecentric housing portion 42, an etalon filter housing portion 44, a plurality of snouts 52, and a drawtube portion 53. The telecentric housing portion 42 attaches to the etalon filter housing portion 44 via a bridge portion 50. The snouts 52 are adapted to enable the housing 18 to be attached to a telescope drawtube. A person of ordinary skill in the art will understand that the diameter of the snouts 52 can be sized in an appropriate manner so as to enable the housing 18 to be attached to various sizes of telescope drawtubes. The drawtube portion 53 is adapted to enable telescope accessories (e.g., eyepieces or cameras) to be mounted to the housing 18. The housing 18 further comprises at least one baffle 54. The at least one baffle 54 is located between the diverging lens 12 and the converging lens 14. Preferably, the housing comprises a plurality of baffles 54 located between the diverging lens 12 and the converging lens 14. A person of ordinary skill in the art will understand that the plurality of baffles 54 can be flat edged or knife-edged (i.e., sharpened). It is to be understood that the arrangement, number, and location of the baffles 54 within the optical lens assembly 10 can be modified depending upon the desired wavelength range.

When the optical lens assembly 10 is assembled, the diverging lens 12, the converging lens 14, and the etalon filter 16 are positioned within the housing 18, as shown in FIG. 6. Retaining rings 55, shown in FIGS. 5, 6 and 7, within the housing 18 retain the diverging lens 12, the converging lens 14, and the blocking filter 56. Preferably, the diverging lens 12 and the converging lens 14 are positioned within the telecentric housing portion 42 and the etalon filter 16 is positioned within the etalon filter housing portion 44 as shown in FIGS. 6 and 7. Preferably, a heated cell 46 is positioned within the etalon filter housing portion 44, as shown in FIG. 5. The heated cell 46 surrounds the etalon filter 16 and is attached to electronics 48 that regulate the temperature of the heated cell. The electronics 48 enable a center wavelength of the etalon filter 16 to be adjusted by varying the temperature of the heated cell 46. The electronics 48 comprise a knob 49 adapted to adjust the temperature of the heated cell 46. The diverging lens 12 is located between the first opening 34 and the converging lens 14. The etalon filter 16 is located between the converging lens 14 and the second opening 36. Preferably, the etalon filter 16 is spaced from the converging lens 14 a distance that is less than the distance between an image form produced by the converging lens and the converging lens itself.

Preferably, the optical lens assembly 10 further comprises a blocking filter 56, as shown in FIG. 5. The blocking filter 56 is adapted to reject light rays greater than ten angstroms away from the desired wavelength. More preferably, the blocking filter 56 is adapted to reject light rays greater than five angstroms away from the desired wavelength range.

More preferably, the blocking filter 56 is adapted to reject light rays greater than three angstroms away from the desired wavelength range. More preferably, the blocking filter 56 is adapted to reject lights rays greater than one angstrom away from the desired wavelength range. When the optical lens assembly 10 is assembled, the blocking filter 56 is located between the first opening 34 and the diverging lens 12.

The diverging lens 12 has a first focal length and the converging lens 14 has a second focal length. The first focal length will be of a first value and the second focal length will be of a second value. Preferably, when the optical lens assembly 10 is assembled, the converging lens 14 is spaced from the diverging lens 12 by a distance substantially equivalent to the sum of the first and second value such that the diverging and converging lens are telecentric. More preferably, the optical lens assembly 10 is assembled in a manner such that the optical axis 26 of the diverging lens 12, the optical axis 32 of the converging lens 14, and the longitudinal axis X of the housing 18 are generally coincident with each other.

When the optical lens assembly 10 is exposed to a light source, light rays enter the housing 18 via the first opening 34. The lights rays that enter the housing 18 of the optical lens assembly 10 then become incident upon the blocking filter 56. Light rays incident upon the blocking filter 56 and within ten angstroms of the desired wavelength range are transmitted through the blocking filter. The light rays transmitted through the blocking filter 56 next become incident upon the first surface 22 of the diverging lens 12. The diverging lens 12 is adapted such that at least some of the light rays incident upon the first surface 22 diverge away from the optical axis 26 as the light rays extend from the second surface 24 of the diverging lens. Light rays diverging away from the optical axis 26 of the diverging lens 12 at an angle greater than θ are obstructed by the baffles 54. Light rays diverging away from the optical axis 26 of the diverging lens 12 at an angle less than or equal to θ become incident upon the first surface 28 of the converging lens 14. It is to be understood that the value of the angle θ can be adjusted. The larger the value of the angle θ, the larger the optical path difference of light rays that become incident upon the converging lens 14. Conversely, the smaller the value of the angle θ, the smaller the optical path difference of light rays that become incident upon the converging lens 14. An optical lens assembly with a smaller optical path difference has a more superior aberration performance than does an optical lens assembly with a larger optical path difference. However, an optical lens assembly having a smaller optical path difference will have a larger assembly length than does an optical lens assembly having a larger optical path difference. Preferably, the diverging lens and the converging lens are of a focal length such that light rays that ultimately become incident upon the etalon filter 16 are approximately F/20 to F/30 in focal ratio. It is to be understood that the optical lens assembly 10 can be assembled such that light rays that ultimately become incident upon the etalon filter 16 are less than F/20 in focal ratio or greater than F/30 in focal ratio. The converging lens 14 is adapted such that the light rays incident upon the first surface 28 of the converging lens converge toward the optical axis 32 as the light rays extend from the second surface 30 of the converging lens. The light rays extending from the second surface 30 of the converging lens 14 then become incident upon the etalon filter 16. The etalon filter 16 is adapted to transmit light rays having a wavelength within a desired wavelength range.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

It should also be understood that when introducing elements of the present invention in the claims or in the above description of exemplary embodiments of the invention, the terms "comprising," "including," and "having" are intended to be open-ended and mean that there may be additional elements other than the listed elements. Additionally, the term "portion" should be construed as meaning some or all of the item or element that it qualifies. Moreover, use of identifiers such as first and second should not be construed in a manner imposing any relative position or time sequence between limitations.

What is claimed is:

1. An optical lens assembly adapted for a solar telescope, the lens assembly comprising:
   a diverging lens comprising a first surface and a first optical axis, the diverging lens being adapted to diverge a majority of light rays incident on the first surface away from the first optical axis;
   a converging lens comprising a second surface and a second optical axis, the converging lens being spaced from the diverging lens, the converging lens being adapted to converge a majority of light rays incident on the second surface toward the second optical axis;
   an etalon filter adapted to transmit light rays having a wavelength within a desired wavelength range; and
   a housing extending generally along a longitudinal axis, the housing defining first and second openings at opposite first and second ends of the housing, the first opening being adapted to permit light rays to enter the housing, wherein the diverging lens, the converging lens, and the etalon filter are positioned within the housing, the diverging lens being located between the first opening and the converging lens, and the etalon filter being located between the converging lens and the second opening and the housing comprises at least one baffle located between the diverging lens and the converging lens.

2. The optical lens assembly as set forth in claim 1, wherein the first optical axis, the second optical axis, and the longitudinal axis are generally coincident with each other.

3. The optical lens assembly as set forth in claim 1, wherein the housing comprises a telecentric housing portion and an etalon filter housing portion, the diverging and converging lens being positioned within the telecentric housing portion and the etalon filter being positioned within the etalon filter housing portion.

4. The optical lens assembly as set forth in claim 3, wherein the telecentric housing portion comprises a plurality of baffles.

5. The optical lens assembly as set forth in claim 3, wherein the optical lens assembly further comprises a heated cell, the heated cell being positioned within the etalon filter housing portion so that the heated cell at least partially surrounds the etalon filter.

6. The optical lens assembly as set forth in claim 3, wherein the housing further comprises a bridge portion, the bridge portion coupling the telecentric housing portion and the etalon filter housing portion.

7. The optical lens assembly as set forth in claim 5, wherein the housing further comprises a draw tube portion coupled to the filter housing, the draw tube portion being spaced from the telecentric portion, the draw tube portion being adapted to enable telescope accessories to be mounted to the optical lens assembly.

8. The optical lens assembly as set forth in claim 1, wherein the optical lens assembly comprises a blocking filter located between the first opening and the diverging lens.

9. The optical lens assembly as set forth in claim 8, wherein the blocking filter is adapted to reject light rays greater than ten angstroms away from the desired wavelength range.

10. The optical lens assembly as set forth in claim 8, wherein the blocking filter is adapted to reject light rays greater than five angstroms away from the desired wavelength range.

11. The optical lens assembly as set forth in claim 8, wherein the blocking filter is adapted to reject light rays greater than three angstroms away from the desired wavelength range.

12. The optical lens assembly as set forth in claim 8, wherein the blocking filter is adapted to reject light rays greater than one angstrom away from the desired wavelength range.

13. The optical lens assembly as set forth in claim 1, wherein the diverging lens has a first focal length and the converging lens has a second focal length, the first focal length being of a first value and the second focal length being of a second value, the converging lens being spaced from the diverging lens by a distance that is substantially equivalent to a sum of the first and second values such that the diverging and converging lens are telecentric.

14. The optical lens assembly as set forth in claim 1, wherein the desired wavelength range is 200 nanometers and 1100 nanometers.

15. The optical lens assembly as set forth in claim 1, wherein the desired wavelength range from about 656.1 nanometers to about 656.5 nanometers.

16. The optical lens assembly as set forth in claim 1, wherein the desired wavelength range is from about 396.3 nanometers to about 397.4 nanometers.

17. The optical lens assembly as set forth in claim 1, wherein the desired wavelength range is from about 392.8 nanometers to about 393.9 nanometers.

18. The optical lens assembly as set forth in claim 1, wherein the desired wavelength range is from about 485.6 nanometers to about 486.7 nanometers.

19. The optical lens assembly as set forth in claim 1, wherein the desired wavelength range is from about 587.0 nanometers to about 588.1 nanometers.

20. The optical lens assembly as set forth in claim 1, wherein the desired wavelength range is from about 588.5 nanometers to about 590.1 nanometers.

21. The optical lens assembly as set forth in claim 1, wherein the desired wavelength range is from about 529.2 nanometers to about 531.3 nanometers.

22. The optical lens assembly as set forth in claim 1, wherein the desired wavelength range is from about 759.3 nanometers to about 777.7 nanometers.

23. The optical lens assembly as set forth in claim 1, wherein the etalon filter is a Fabry-Perot etalon filter.

24. An optical lens assembly adapted for a solar telescope, the lens assembly comprising:

a Barlow lens comprising a diverging lens, a converging lens, and an optical axis, the diverging lens being spaced from the converging lens, the diverging lens being adapted to diverge a majority of light rays incident on said diverging lens away from the optical axis, and the converging lens being adapted to converge a majority of light rays incident on said converging lens toward the optical axis;

an etalon filter adapted to transmit light rays having a wavelength within a desired wavelength range; and a housing extending generally along a longitudinal axis, the housing defining first and second openings at opposite first and second ends of the housing, the first opening being adapted to permit light rays to enter the housing, wherein the diverging lens, the converging lens, and the etalon filter are positioned within the housing, the diverging lens being located between the first opening and the converging lens, and the etalon filter being located between the converging lens and the second opening and the housing comprises at least one baffle located between the diverging lens and the converging lens, the at least one baffle being adapted to obstruct some of the light rays diverging away from the optical axis.

25. A method of assembling an optical lens assembly adapted for a solar telescope, the method comprising:

positioning a diverging lens, a converging lens, and an etalon filter within a housing, wherein the housing is extending generally along a longitudinal axis with first and second openings at opposite first and second ends of the housing with the first opening being adapted to permit light rays to enter the housing, wherein the diverging lens comprising a first surface and a first optical axis, the diverging lens being adapted to diverge a majority of light rays incident on the first surface away from the first optical axis, and the converging lens comprising a second surface and a second optical axis with the converging lens being spaced from the diverging lens and the converging lens being adapted to converge a majority of light rays incident on the second surface toward the second optical axis, and the etalon filter is adapted to transmit light rays having a wavelength within a desired wavelength range, wherein the diverging lens being located between the first opening and the converging lens and the etalon filter being located between the converging lens and the second opening, wherein the housing comprises at least one baffle located between the diverging lens and the converging lens.

26. The method of assembling an optical lens assembly adapted for a solar telescope in accordance with claim 25, further comprising:

positioning the diverging and converging lens within a telecentric housing portion of the housing; and positioning the etalon filter within an etalon filter housing portion of the housing.

27. The method of assembling an optical lens assembly adapted for a solar telescope in accordance with claim 26, further comprising inserting a plurality of baffles into the telecentric housing portion.

28. The method of assembling an optical lens assembly adapted for a solar telescope in accordance with claim 27, further comprising positioning a heated cell within the etalon filter housing portion, the heated cell at least partially surrounding the etalon filter.

29. The method of assembling an optical lens assembly adapted for a solar telescope in accordance with claim 27, further comprising inserting a blocking filter into the optical lens assembly.

30. An optical lens assembly adapted for a solar telescope, the lens assembly comprising:
a diverging lens comprising a first surface and a first optical axis, the diverging lens being adapted to diverge a light ray that is incident on the first surface and spaced from the first optical axis away from said first optical axis;
a converging lens comprising a second surface and a second optical axis, the converging lens being spaced from the diverging lens, the converging lens being adapted to converge a light ray that is incident on the second surface and spaced from the second optical axis toward said second optical axis;
an etalon filter adapted to transmit light rays having a wavelength within a desired wavelength range; and
a housing extending generally along a longitudinal axis, the housing defining first and second openings at opposite first and second ends of the housing, the first opening being adapted to permit light rays to enter the housing, wherein the diverging lens, the converging lens, and the etalon filter are positioned within the housing, the diverging lens being located between the first opening and the converging lens, and the etalon filter being located between the converging lens and the second opening and the housing comprises the at least one baffle located between the diverging lens and the converging lens.

31. The optical lens assembly as set forth in claim 30, wherein the first optical axis, the second optical axis, and the longitudinal axis are generally coincident with each other.

32. The optical lens assembly as set forth in claim 30, wherein the housing comprises a telecentric housing portion and an etalon filter housing portion, the diverging and converging lens being positioned within the telecentric housing portion and the etalon filter being positioned within the etalon filter housing portion.

33. The optical lens assembly as set forth in claim 32, wherein the telecentric housing portion comprises a plurality of baffles.

34. The optical lens assembly as set forth in claim 32, wherein the optical lens assembly further comprises a heated cell, the heated cell being positioned within the etalon filter housing portion so that the heated cell at least partially surrounds the etalon filter.

35. The optical lens assembly as set forth in claim 32, wherein the housing further comprises a bridge portion, the bridge portion coupling the telecentric housing portion and the etalon filter housing portion.

36. The optical lens assembly as set forth in claim 34, wherein the housing further comprises a draw tube portion coupled to the etalon filter housing, the draw tube portion being spaced from the telecentric portion, the draw tube portion being adapted to enable telescope accessories to be mounted to the optical lens assembly.

37. The optical lens assembly as set forth in claim 30, wherein the optical lens assembly comprises a blocking filter located between the first opening and the diverging lens.

38. The optical lens assembly as set forth in claim 37, wherein the blocking filter is adapted to reject light rays greater than ten angstroms away from the desired wavelength range.

39. The optical lens assembly as set forth in claim 37, wherein the blocking filter is adapted to reject light rays greater than five angstroms away from the desired wavelength range.

40. The optical lens assembly as set forth in claim 37, wherein the blocking filter is adapted to reject light rays greater than three angstroms away from the desired wavelength range.

41. The optical lens assembly as set forth in claim 37, wherein the blocking filter is adapted to reject light rays greater than one angstrom away from the desired wavelength range.

42. The optical lens assembly as set forth in claim 30, wherein the diverging lens has a first focal length and the converging lens has a second focal length, the first focal length being of a first value and the second focal length being of a second value, the converging lens being spaced from the diverging lens by a distance that is substantially equivalent to a sum of the first and second values such that the diverging and converging lens are telecentric.

43. The optical lens assembly as set forth in claim 30, wherein the desired wavelength range is 200 nanometers and 1100 nanometers.

44. The optical lens assembly as set forth in claim 30, wherein the desired wavelength range from about 656.1 nanometers to about 656.5 nanometers.

45. The optical lens assembly as set forth in claim 30, wherein the desired wavelength range is from about 396.3 nanometers to about 397.4 nanometers.

46. The optical lens assembly as set forth in claim 30, wherein the desired wavelength range is from about 392.8 nanometers to about 393.9 nanometers.

47. The optical lens assembly as set forth in claim 30, wherein the desired wavelength range is from about 485.6 nanometers to about 486.7 nanometers.

48. The optical lens assembly as set forth in claim 30, wherein the desired wavelength range is from about 587.0 nanometers to about 588.1 nanometers.

49. The optical lens assembly as set forth in claim 30, wherein the desired wavelength range is from about 588.5 nanometers to about 590.1 nanometers.

50. The optical lens assembly as set forth in claim 30, wherein the desired wavelength range is from about 529.2 nanometers to about 531.3 nanometers.

51. The optical lens assembly as set forth in claim 30, wherein the desired wavelength range is from about 759.3 nanometers to about 777.7 nanometers.

52. The optical lens assembly as set forth in claim 30, wherein the etalon filter is a Fabry-Perot etalon filter.

* * * * *